(12) United States Patent
Yi et al.

(10) Patent No.: US 10,635,210 B2
(45) Date of Patent: Apr. 28, 2020

(54) TOUCH SCREEN DISPLAY DEVICE AND DRIVING CIRCUIT THEREOF WITH DIFFERENT DISPLAY PERIOD TIME LENGTHS WITHIN A SINGLE FRAME

(71) Applicant: LG Display Co., Ltd., Seoul (KR)

(72) Inventors: Dae Kyu Yi, Paju-si (KR); In Rae Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 216 days.

(21) Appl. No.: 15/699,447

(22) Filed: Sep. 8, 2017

(65) Prior Publication Data

US 2018/0188863 A1 Jul. 5, 2018

(30) Foreign Application Priority Data

Dec. 30, 2016 (KR) .................. 10-2016-0184471

(51) Int. Cl.
*G06F 3/044* (2006.01)
*G06F 3/041* (2006.01)
*G09G 3/20* (2006.01)
*G09G 3/36* (2006.01)

(52) U.S. Cl.
CPC ............ *G06F 3/0412* (2013.01); *G06F 3/044* (2013.01); *G06F 3/0416* (2013.01); *G09G 3/2092* (2013.01); *G09G 3/3677* (2013.01); *G09G 3/3688* (2013.01); *G09G 2310/08* (2013.01)

(58) Field of Classification Search
CPC ...... G06F 3/044; G06F 3/0412; G06F 3/0418; G06F 3/038
See application file for complete search history.

(56) References Cited

U.S. PATENT DOCUMENTS

| 9,024,913 | B1* | 5/2015 | Jung | G06F 3/044 345/174 |
| 2012/0056834 | A1* | 3/2012 | Kim | G06F 3/0418 345/173 |
| 2012/0218199 | A1* | 8/2012 | Kim | G06F 3/0412 345/173 |
| 2012/0313866 | A1* | 12/2012 | Ha | G06F 3/0416 345/173 |
| 2014/0062907 | A1* | 3/2014 | Kim | G06F 3/038 345/173 |
| 2014/0132560 | A1* | 5/2014 | Huang | G06F 3/044 345/174 |
| 2015/0022486 | A1* | 1/2015 | Li | G06F 3/0412 345/174 |
| 2016/0259445 | A1* | 9/2016 | Yang | G06F 3/044 |
| 2016/0266694 | A1* | 9/2016 | Lee | G06F 3/0412 |

FOREIGN PATENT DOCUMENTS

KR 10-2013-0095461 8/2013

* cited by examiner

*Primary Examiner* — Jennifer Mehmood
*Assistant Examiner* — James S Nokham
(74) *Attorney, Agent, or Firm* — Fenwick & West LLP

(57) ABSTRACT

Disclosed is a touch screen display device. The touch screen display device includes a first driver displaying an image on a first area of a display panel during a first display period and displaying an image on a second area of the display panel during a second display period and a second driver applying a touch driving signal to a third area of the display panel during a first touch period. A length of the first display period and a length of the second display period are differently set in LHB driving. Accordingly, audible noise is minimized, and touch latency is fast.

22 Claims, 10 Drawing Sheets t1 : 650.88
t2 : 813.6
t3 : 3832.96

TOUCH SCREEN DISPLAY DEVICE AND DRIVING CIRCUIT THEREOF WITH DIFFERENT DISPLAY PERIOD TIME LENGTHS WITHIN A SINGLE FRAME

CROSS-REFERENCE TO RELATED APPLICATIONS

This application claims the benefit of the Korean Patent Application No. 10-2016-0184471 filed on Dec. 30, 2016, which is hereby incorporated by reference as if fully set forth herein.

BACKGROUND

Field of the Invention

The present disclosure relates to a touch screen display device and a driving circuit thereof.

Discussion of the Related Art

With the advancement of information-oriented society, various requirements for display devices for displaying an image are increasing. Therefore, various types of display devices such as liquid crystal display (LCD) devices, plasma display panel (PDP) devices, organic light emitting display devices, etc. are being used.

Moreover, among display devices, mobile devices such as smartphones and tablet personal computers (PCs) and medium and large devices such as smart televisions (TVs) provide touch type input processing depending on user convenience and device characteristic.

Touch processing-enabled display devices are advancing to provide a greater number of various functions, and the requirements of users are being more diversified.

The touch processing-enabled display devices perform a display driving operation of displaying an image on a display panel and a touch driving operation of sensing a touch position and a touch force based on a user touch input. A driving method is divided into an independent driving method, where a display driving period and a touch driving period are independently performed without a correlation therebetween depending on a touch screen type, and a time division driving method where the display driving period and the touch driving period are temporally divided and time-divisionally performed.

For example, add-on touch screen display devices where a touch panel is provided on and coupled to a display panel or on-cell touch screen display devices where touch electrodes are directly provided on a display panel are generally driven in an independent driving method, and in-cell touch screen display devices where touch electrodes are provided in a display panel are generally driven in a time division driving method.

Particularly, the time division driving method may be performed in a V_Blank method shown in FIG. 1A or a Long H Blank (LHB) method shown FIG. 1B.

Here, the V_Blank method shown in FIG. 1A is a method where a display period and a touch period are time-divisionally driven during one frame divided by a vertical synchronization signal Vsync, and all pixels of a display panel are driven during the display period and then a touch driving signal is applied to all touch electrodes of the display panel during the touch period. An operation of transmitting touch data of the touch electrodes, to which the touch driving signal is applied, to a host system is performed during a display period of a next frame. The display period and the touch period are differentiated from each other according to a touch enable signal Touch_En. In FIG. 1A, a period during which the touch enable signal is activated (ON) is defined as the touch period, but is not limited thereto. The V_Blank method shown in FIG. 1A of the present disclosure performs a one-time touch report during one frame (60 Hz), and thus, a touch report rate is 60 Hz. In order to enhance touch performance, the V_Blank method may perform driving at 120 Hz, but has a problem where coordinates are transmitted by using touch coordinates of a previous frame instead of real coordinates, or a length of the display period should be reduced for maintaining a long touch driving time. In FIG. 1A, one frame is defined as one 60 Hz period and described, but one frame may have a frequency higher than 60 Hz. This can affect the touch report rate.

Next, the Long H_Blank method shown in FIG. 1B is a method where the display period and the touch period are time-divisionally driven a plurality of times during one frame divided by the vertical synchronization signal Vsync, and is a method where a period of a specific horizontal synchronization signal Hsync is long allocated and used as the touch period. Pixels of the display panel are divisionally driven during the display period divided into 2n number and the touch driving signal is applied to touch electrodes of the display panel which are divisionally driven during the touch period divided into 2n number, and in this case, the display period and the touch period are repeatedly and alternately performed. The touch driving signal is applied to all touch electrodes, and then, touch data of the touch electrodes are transmitted to the host system in a current frame and a next frame. The display period and the touch period are differentiated from each other according to the touch enable signal Touch_En. In FIG. 1B, a period during which the touch enable signal is activated (ON) is defined as the touch period, but is not limited thereto. The Long H_Blank method shown in FIG. 1B of the present disclosure performs a touch report twice in a current frame and a next frame during one frame period (60 Hz), and thus, a touch report rate is 120 Hz. However, in a related art Long H_Blank method, the touch report is slow, and audible noise occurs. In FIG. 1B, one frame is defined as one 60 Hz period and described, but one frame may have a frequency higher than 60 Hz. This can affect the touch report rate.

As described above, in the time division driving method, the V_Blank method and the Long H_Blank method which are generally applied have a limitation due to the above-described problems in terms of a current situation where the requirements of users should be satisfied by providing various kinds of functions in various types.

SUMMARY

Accordingly, the present disclosure is directed to providing a touch screen display device and a driving circuit thereof that substantially obviate one or more problems due to limitations and disadvantages of the related art.

An aspect of the present disclosure is directed to providing a touch screen display device and a driving circuit, in which a touch performance of a display panel is enhanced for providing various kinds of functions in various types.

Another aspect of the present disclosure is directed to providing a touch screen display device and a driving circuit, in which touch latency is improved and audible noise is minimized.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a touch screen display device including a display panel, a display driver to provide first data voltages for displaying an image on a predetermined first area of the display panel during a first display period and to provide second data voltages for displaying an image on a predetermined second area of the display panel during a second display period, and a touch driver applying a touch driving signal to one or more first touch electrodes of a predetermined third area of the display panel during a first touch period, wherein a length of the first display period differs from a length of the second display period, and the first touch period is provided between the first display period and the second display period. Accordingly, a touch performance of the display panel is enhanced.

The touch driver applies the touch driving signal to one or more second touch electrodes of a predetermined fourth area of the display panel during a second touch period, and a length of the first touch period is the same as a length of the second touch period.

The first and second display periods and the first and second touch periods are provided in one frame period defined by two vertical synchronization signals.

The second display period is longer than the first display period.

The display driver provides third data voltages for displaying an image on a predetermined fifth area of the display panel during a third display period, and a length of the third display period is shorter than the second display period and longer than the first display period.

The first to third display periods and the first and second touch periods are provided in one frame period defined by two vertical synchronization signals.

Each of the second and third display periods may be provided once in the one frame period, and the first display period may be provided a total of five times in the one frame period.

The second display period may be a fourth display period of a plurality of display periods provided in the one frame period, and the third display period may be a seventh display period of the plurality of display periods provided in the one frame period.

During the second display period, touch data based on the touch driving signal applied to the predetermined third area is transmitted to a host system.

The touch screen display device may further include five touch periods, wherein lengths of the five touch periods are the same.

The touch screen display device may further include five display periods, wherein a length of at least one of the five display periods differs from a length of each of the other display periods.

The touch driver applies the touch driving signal to the first touch electrodes of the predetermined third area twice or more during the one frame period, or applies the touch driving signal to the second touch electrodes of the predetermined fourth area twice or more during the one frame period.

The display panel includes a plurality of gate lines and a plurality of data lines for displaying an image and a plurality of touch electrodes for touch driving.

Each of the plurality of touch electrodes is a common electrode which is used to display an image along with the plurality of gate lines and the plurality of data lines. Accordingly, an additional process of forming touch electrodes for touch sensing is not needed.

Each of the plurality of touch electrodes operates as the common electrode in a display period and operates a touch electrode in a touch period, whereby the touch screen display device has a time division driving feature.

The touch driver applies the touch driving signal or a driving signal having the same phase as a phase of the touch driving signal to the plurality of gate lines and the plurality of data lines during the touch period, whereby the touch screen display device has a load free driving (LFD) feature.

In another aspect of the present disclosure, there is provided a driving circuit of a touch screen display device including a display driver to provide first data voltages for displaying an image on a predetermined first area of a display panel during a first display period and to provide second data voltages for displaying an image on a predetermined second area of the display panel during a second display period and a touch driver applying a touch driving signal to touch electrodes of a predetermined third area of the display panel during a first touch period, wherein a length of the first display period differs from a length of the second display period, and the first touch period is between the first display period and the second display period. Accordingly, a touch performance of the display panel is enhanced.

According to still another aspect of the present disclosure, a touch screen display device is provided, the touch screen display device comprising a display panel including a plurality of touch electrodes and a plurality of pixels at intersections of a plurality of gate lines and a plurality of data lines; and driver circuitry to provide data voltages to the pixels for display of an image during a plurality of display periods and to apply a touch driving signal to the touch electrodes during a plurality of touch periods. A first predetermined number of the display periods and a second predetermined number of the touch periods are provided within one frame period, where the first predetermined number is a natural number not less than two and the second predetermined number us a natural number not less than one. The first predetermined number of the display periods alternate with the second predetermined number of the touch periods within said one frame period. A first length of at least one of the display periods within said one frame period is different from a second length of at least a remaining one of the display periods within said one frame period. In some embodiments, the second predetermined number of the touch periods provided within the one frame period have a same length. In some embodiments, the one frame period is defined by two consecutive vertical synchronization signals.

In some embodiments, the driver circuitry performs touch reporting during said at least one of the display periods having the first length different from the second length. In some embodiments, the first length is longer than the second length. In some embodiments, the driver circuitry performs touch reporting twice during said one frame period.

In some embodiments, the first predetermined number of the display periods include a first display period and a second display period longer than the first display period; the second predetermined number of touch periods include a first touch period occurring between the first display period and the second display period; the driver circuitry provides a first set of the pixels with a first set of the data voltages during the first display period and a second set of the pixels with a second set of the data voltages during the second display period; the driver circuitry applies the touch driving signal to a first set of the touch electrodes during the first touch period; and the driver circuitry performs touch reporting during the second display period. In some embodiments, the second predetermined number of touch periods may further include a second touch period occurring subsequent to the second display period; and the driver circuitry may apply the touch driving signal to a second set of the touch electrodes during the second touch period.

In some other embodiments, the first predetermined number of the display periods include a first display period, a second display period, a third display period, a fourth display period, a fifth display period, a sixth display period, and a seventh display period occurring in sequence within the one frame period, the seventh display period being longer than the first, second, third, fifth, and sixth display periods; the second predetermined number of the touch periods include, within the one frame period, a first touch period between the first display period the second display period, a second touch period between the second display period and the third display period, a third touch period between the third display period and the fourth display period, a fourth touch period between the fourth display period and the fifth display period, a fifth touch period between the fifth display period and the sixth display period, and a sixth touch period between the sixth display period and the seventh display period; and the driver circuitry performs touch reporting during the seventh display period. In some embodiments, the fourth display period is longer than the first, second, third, fifth, sixth, and seventh display periods; and the driver circuitry further performs touch reporting during the fourth display period.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1A:
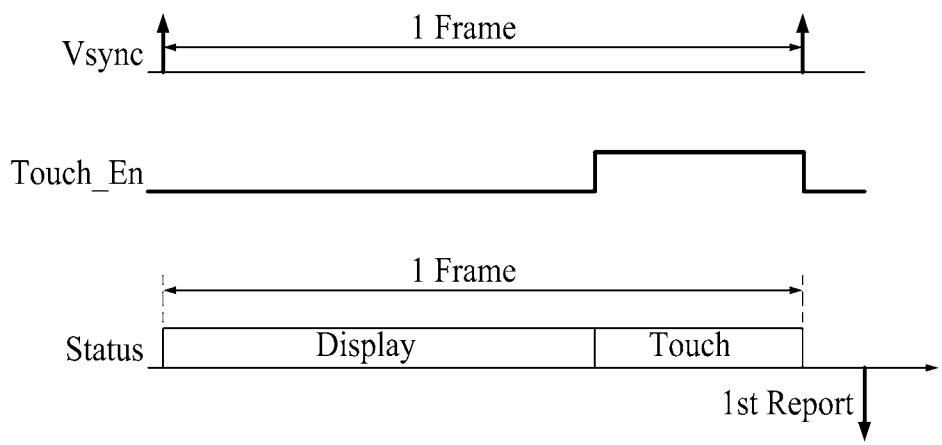
FIGS. 1A and 1B are time division driving timing diagrams of a touch screen display device of the related art.
Figure 1B:
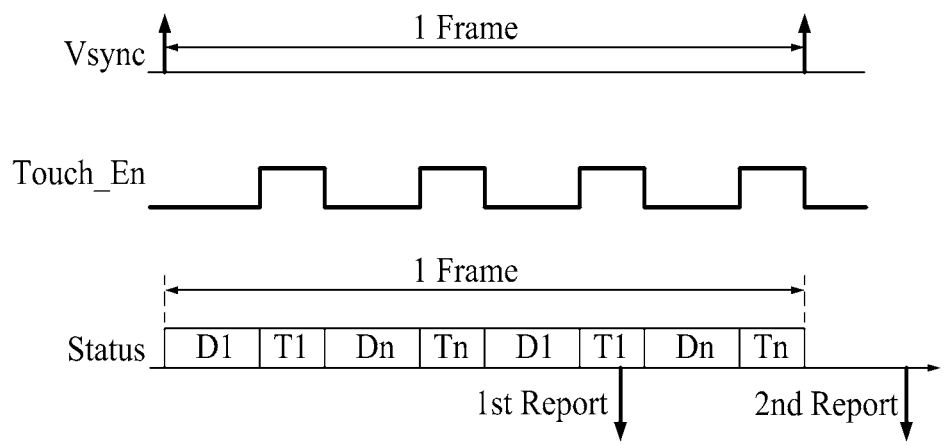

Reference will now be made in detail to the exemplary embodiments of the present disclosure, examples of which are illustrated in the accompanying drawings. Wherever possible, the same reference numbers will be used throughout the drawings to refer to the same or like parts.

Hereinafter, exemplary embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present disclosure.

In describing elements of the present disclosure, the terms "first", "second", "A", "B", "(a)", "(b)", etc. may be used. The terms are merely for differentiating one element from another element, and the essence, sequence, order, or number of a corresponding element should not be limited by the terms. It will be understood that when an element or layer is described as being "connected", "coupled", or "adhered" to another element or layer, the element or layer can be directly connected or adhered to the other element or layer, but the other element or layer can be "disposed" between elements or layers, or elements or layers can be "connected", "coupled", or "adhered" to each other through the other element or layer.

The present disclosure may be applied to in-cell touch screen display devices where touch electrodes or touch sensors are provided in a display device such as an LCD device, a field emission display device, a PDP device, an organic light emitting display device, an electrophoretic display device, or a quantum dot display device. Also, if add-on touch screen display devices where a touch panel is provided on and coupled to a display panel or on-cell touch screen display devices where touch electrodes are directly provided on a display panel are driven in a time division method, some embodiments of the present disclosure may be applied to the add-on touch screen display devices and the on-cell touch screen display devices. Therefore, in embodiments of the present disclosure described below, an in-cell touch screen driven in the time division driving method will be described, but the spirit and scope of the present disclosure are not limited thereto.

Figure 2:
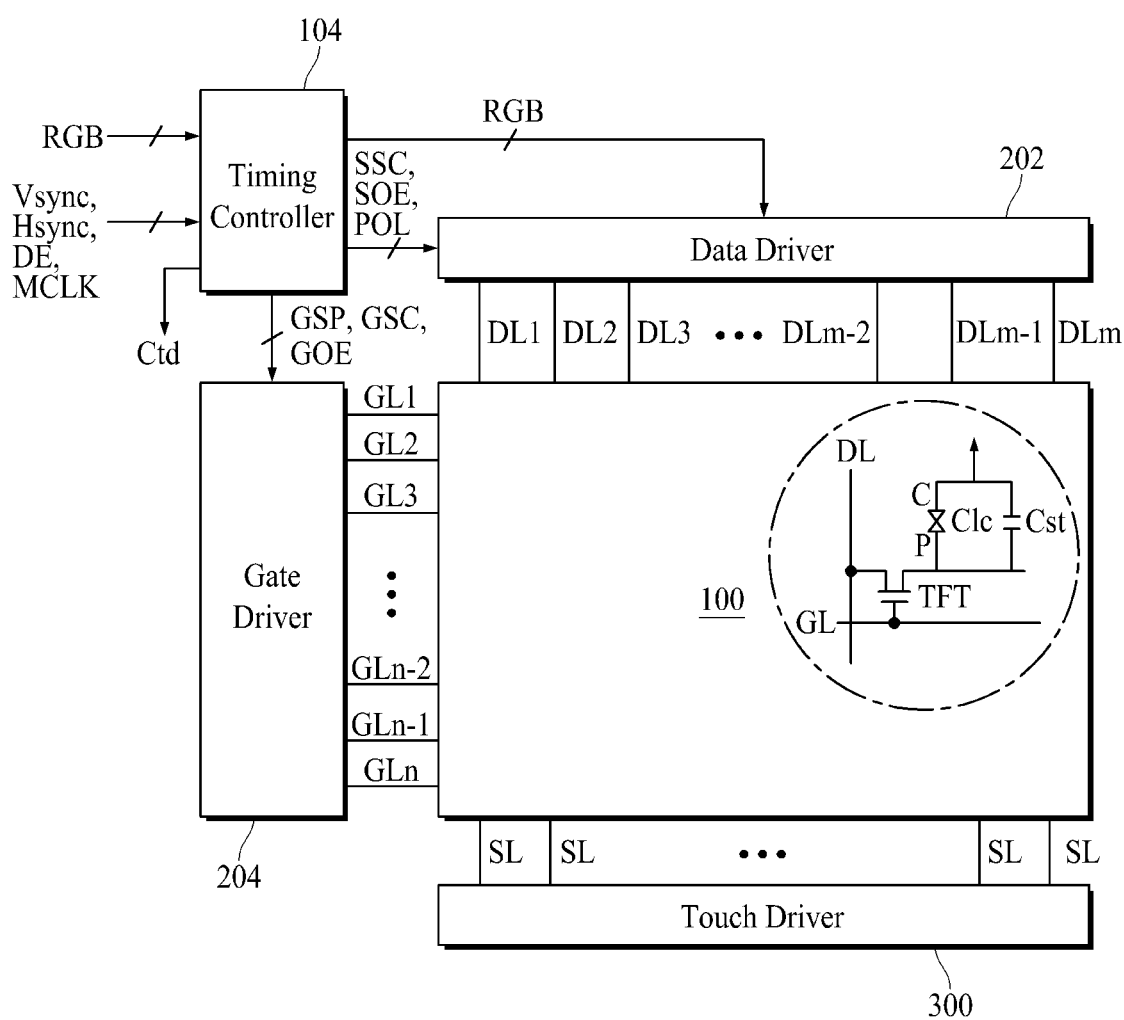
FIG. 2 is a block diagram schematically illustrating a touch screen display device according to an embodiment of the present disclosure.

First, a touch screen display device according to an embodiment of the present disclosure will be described in detail with reference to FIGS. 2 and 3. FIG. 2 is a block diagram schematically illustrating a touch screen display device according to an embodiment of the present disclosure, and FIG. 3 is an exploded perspective view schematically illustrating a display panel area of a touch screen display device according to an embodiment of the present disclosure.

The touch screen display device according to an embodiment of the present disclosure, as illustrated in FIG. 2, may include a display panel 100, a timing controller 104, a data driver 202, a gate driver 204, and a touch driver 300. The data driver 202 and the gate driver 204 according to the present embodiment illustrated in FIG. 2 may be integrated and provided as a display driver which is one element, and moreover, the timing controller 104 may be an element included in the display driver. Also, the touch driver 300 may be integrated into the display driver without being provided as an independent element. In this case, the elements may be provided as a display/touch integration driver. Alternatively, the touch driver 300 may be individually integrated with each element such as the gate driver 204 or the data driver 202.

Figure 3:
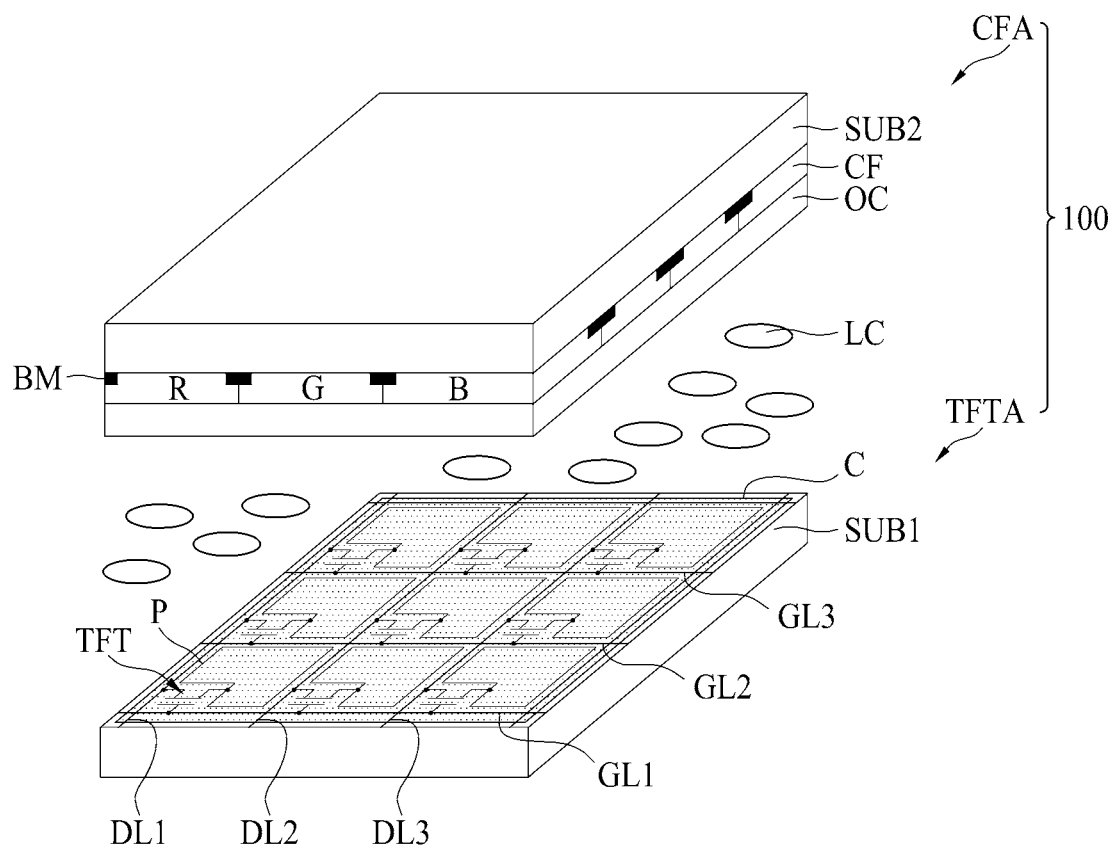
FIG. 3 is an exploded perspective view schematically illustrating a display panel area of a touch screen display device according to an embodiment of the present disclosure.

The display panel 100, as illustrated in FIG. 3, may include two substrates and a liquid crystal layer provided between the two substrates. A plurality of data lines DL1 to DLm (where m is a positive integer), a plurality of gate lines GL1 to GLn (where n is a positive integer) intersecting the plurality of data lines DL1 to DLm, a plurality of thin film transistors TFT respectively provided in a plurality of pixel areas defined by intersections of the data lines DL1 to DLm and the gate lines GL1 to GLn, a plurality of pixel electrodes for charging data voltages into a plurality of liquid crystal cells CLc, a storage capacitor Cst connected to a corresponding pixel electrode P to hold a voltage of a corresponding liquid crystal cell Clc, and a pixel array including a common electrode C may be provided on a lower substrate SUB1 of the display panel 100. Here, the common electrode C may perform a function of a touch electrode and a function of a display electrode depending on a driving method in the display panel which is driven in a time division driving method. The lower substrate may include the thin film transistors TFT, and thus, may be defined as a thin film transistor (TFT) array substrate.

The pixels of the display panel 100 may be provided in the pixel areas defined by the data lines DL1 to DLm and the gate lines GL1 to GLn and may be arranged in a matrix type. The liquid crystal cell of each of the pixels may be driven with an electric field generated based on a voltage difference between a data voltage applied to a pixel electrode P and a common voltage applied to the common electrode C to control a transmittance of incident light. The thin film transistors TFT may be turned on in response to a gate pulse supplied through the gate lines GL1 to GLn to supply voltages, supplied through the data lines DL1 to DLm, to the pixel electrodes P of the liquid crystal cells.

A black matrix BM, a plurality of color filters R, G, and B, and an overcoat layer OC covering the black matrix and the color filters may be provided on an upper substrate SUB2 of the display panel 100. A general upper substrate includes the black matrix and the color filters, and thus, may be referred to as a color filter array (CFA) substrate. However, in a case where the lower substrate SUB1 of the display panel 100 is implemented in a color filter on TFT (COT) structure, the black matrix and the color filters may be provided on the lower substrate of the display panel 100.

In a vertical electric field driving mode such as a twisted nematic (TN) mode or a vertical alignment (VA) mode, the common electrode C may be provided on the upper substrate SUB2. In a lateral electric field driving mode such as an in-plane switching (IPS) mode or a fringe field switching (FFS) mode, the common electrode C and the pixel electrode P may be provided on the lower substrate (or a glass substrate) SUB1. The common electrode C may be connected to a sensing line SL and may be supplied with the common voltage (a display driving voltage) or a touch driving signal.

A polarizer may be attached on each of the upper substrate SUB2 and the lower substrate SUB1 of the display panel 100, and an alignment layer for adjusting a pre-tilting angle of a liquid crystal may be provided on an inner surface contacting the liquid crystal. A column spacer for maintaining a cell gap of the liquid crystal cell Clc may be provided between the upper substrate SUB2 and the lower substrate SUB1 of the display panel 100.

The data driver 202 may include a plurality of data drive integrated circuits (ICs). The data driver may output an analog video data voltage during a predetermined display period. The data driver may latch digital video data RGB input from the timing controller 104. Also, each of the data drive ICs may convert the digital video data RGB by using an analog positive/negative gamma compensation voltage to output analog video data voltages. The analog video data voltages may be supplied to the data lines DL1 to DLm. Also, a touch driving signal or a driving signal having the same phase as that of the touch driving signal may be applied to the data lines DL during a touch period.

The gate driver 204 may include one or more gate drive ICs. During a display period, the gate driver 204 may supply the gate pulse synchronized with the analog video data voltage to the gate lines GL1 to GLn in a predetermined order according to control by the timing controller 104 to select a line of the display panel in which the analog video data voltage is to be written. The gate pulse may be generated as a pulse which swings between a gate high voltage VGH and a gate low voltage VGL. During the touch period, the gate driver 204 may sequentially supply the gate low voltage VGL to the gate lines GL1 to GLn without generating the gate pulse. Therefore, during the display period, the gate lines GL1 to GLn may supply the gate pulse to the thin film transistors TFT of the pixels to a line in which data is to be written in the display panel 100, and during the touch period, the gate lines GL1 to GLn may maintain the gate low voltage. However, during the touch period, the gate driver 204 may apply the touch driving signal or the driving signal having the same phase as that of the touch driving signal to all of the gate lines without generating the gate pulse.

The timing controller 104 may receive a timing signal, including a vertical synchronization signal Vsync, a horizontal synchronization signal Hsync, a data enable single DE, a main clock MCLK, etc., from an external host system to generate timing control signals for controlling an operation timing of the data driver 202 and an operation timing of the gate driver 204. The timing control signal for the gate driver 204 may include a gate start pulse GSP, a gate shift clock GSC, a gate output enable signal GOE, a shift direction control signal, etc. The timing control signal for the data driver 202 may include a source sampling clock SSC, a polarity control signal POL, a source output enable signal SOE, etc.

For reference, the vertical synchronization signal Vsync may be a reference signal which defines one frame period by temporally indicating a start and an end of one screen, and may have a function of transmitting an image frame according to a screen reproduction rate. For example, a display device displays 60 frames per one second (a reproduction rate of 60 Hz), and although a graphic card can display 100 frames per one second, if a vertical synchronization function is turned on, the number of frames displayed per one second is fixed to 60 frames. The horizontal synchronization signal Hsync may be a reference signal which temporally indicates a start and an end of a horizontal line. The data enable signal may be a signal indicating a period (i.e., a period where there is image data to be displayed on a screen) which is actually valid for a one-line time.

The timing controller 104 may control the timing control signals to temporally divide one frame period into at least one display period and at least one touch driving period. By using a touch enable signal Touch_En for differentiating the touch period from the display period, the timing controller 104 may enable an output of each of the data driver 202 and the gate driver 204 to supply video data to the pixels during the display period, and during the touch period, the touch driver 300 may be driven to detect a touch position of a touch screen. The display period and the touch period may be appropriately set in consideration of the kind and characteristic of the display panel 100.

The touch driver 300 may include a switching unit, a sensing unit, an analog-to-digital converter, and a touch controller (not shown herein). Here, the switching unit may supply the common voltage (the display driving voltage) to the common electrodes or may supply the touch driving signal according to the touch enable signal, and may connect the common electrodes to the sensing unit. The sensing unit may be connected to the common electrodes through the switching unit, may integrate a voltage based on a capacitance variation of each of the common electrodes in a self-capacitance type or a mutual capacitance type to generate a sensing voltage, and may supply the generated sensing voltage to the analog-to-digital converter. The analog-to-digital converter may convert the sensing voltage supplied from the sensing unit into digital data to generate touch raw data and may supply the touch raw data to the touch controller. The touch controller may generate a switching control signal to control switching of the switching unit and may analyze the touch raw data supplied from the analog-to-digital converter by using a predetermined touch sensing algorithm to calculate touch position coordinate data. The touch position coordinate data calculated by the touch controller may be transmitted to the external host system. The touch controller may sense a touch position by using the touch raw data, and moreover, may additionally sense a touch force level.

The touch driver according to an embodiment of the preset disclosure may have a load free driving (LFD) feature where the touch driving signal or the driving signal having the same phase as that of the touch driving signal is applied to the plurality of gate lines and the plurality of data lines during the touch period. Here, the LFD may be a driving method which applies the touch driving signal or the driving signal having the same phase as that of the touch driving signal to the plurality of gate lines and the plurality of data lines during the touch period, for removing a parasitic capacitance, noise, or a potential difference occurring between the common electrode and the data line and between the common electrode and the data line.

The host system may execute an application program indicated by a coordinate value of a touch position by using the touch position coordinate data applied from the touch driver 300, thereby allowing the touch position to be displayed on the display device.

Here, the touch driver 300 may transmit touch data such as touch position coordinates of the display panel to the external host system at a speed or a frequency (Hz) corresponding to a predetermined touch report rate. Here, the touch report rate may be defined as a speed or a frequency (Hz) at which the touch data obtained by sensing all the common electrodes of the display panel is transmitted to the external host system. In the touch screen display device, as the touch report rate becomes higher, a touch sensation a user feels becomes better, and a touch input trajectory or a dragging trajectory is accurately recognized. For reference, a display frame rate may denote a speed or a frequency (Hz) at which new data are updated in all the pixels of the display panel, and if one frame is a 60 Hz period, the display frame rate may be 60 Hz. Also, in a case where one frame is a 60 Hz period, if touch data obtained by sensing all the common electrodes of the display panel is transmitted to the external host system a total of once during one frame, the touch report rate of the display panel may be 60 Hz, and if the touch data is transmitted a total of twice during one frame period, the touch report rate of the display panel may be 120 Hz.

Figure 4:
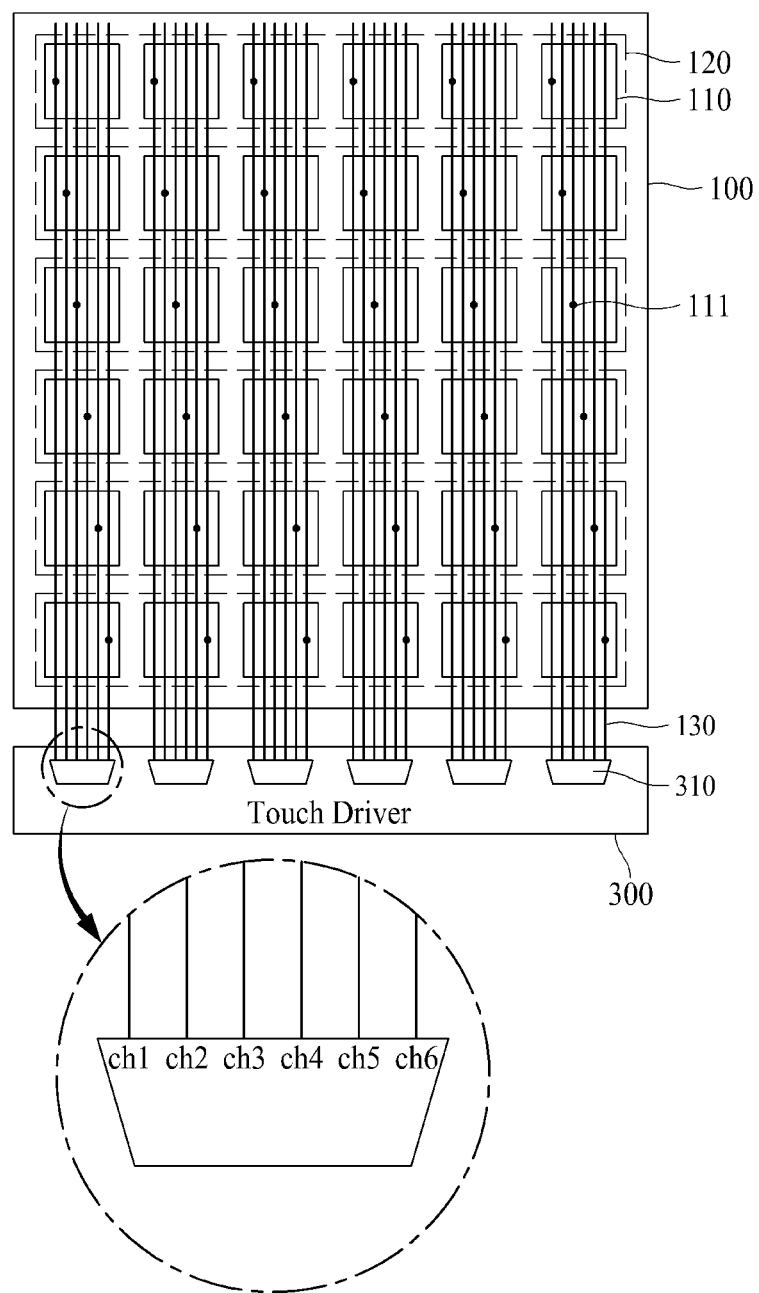
FIG. 4 is a plan view schematically illustrating a common electrode structure of a display panel of a display device according to an embodiment of the present disclosure.

Next, a display panel and a common electrode structure of the display panel according to an embodiment of the present disclosure will be described. FIG. 4 is a plan view schematically illustrating a common electrode structure of a display panel 100 of a display device according to an embodiment of the present disclosure.

The display panel 100, as illustrated in FIG. 4, may include common electrodes 110 and signal lines 130. The common electrodes 110 may be connected to corresponding one or more of the signal lines 130 through one or more contact holes 111 and may be connected to the touch driver 300 at one end of the signal line 130. The touch driver 300, as described above, may include several elements associated with touch driving, in addition to a switching unit, a sensing unit, an analog-to-digital converter, and a touch controller.

In the display period of the display panel which is time-divisionally driven, the common electrode 110 may be supplied with the common voltage to act as a display electrode, and in the touch period, the common electrode 110 may be supplied with the touch driving signal to act as a touch electrode. The common electrodes may have a block form including a plurality of blocks separated from each other in order to act as the touch electrode, and the block form may have various figure shapes in addition to a tetragonal shape. Also, a shape or a size of the common electrode may be differently provided depending on a position at which the common electrode is disposed in the display panel.

In an embodiment of the present disclosure, as illustrated in FIG. 4, the common electrode may be divided into a total of six groups 120 which each include a plurality of common electrodes 110. However, the number of groups according to the present embodiment is not limited to six. The group 120 may be defined as a set of touch electrodes to which the touch driving signal is simultaneously applied, namely, the group 120 may be a unit which is logically divided and grouped in terms of a circuit for application of the touch driving signal, instead of a unit for physically dividing the touch electrodes.

The signal line 130 may be connected to each of the common electrodes. In the display period, the signal line 130 may apply the common voltage to the common electrodes, and in the touch period, the signal line 130 may apply the touch driving signal to the common electrodes. Also, the signal line 130 may transfer a sensing voltage (a sensing signal), generated from the common electrode according to the touch driving signal, to the touch driver. The signal line 130, as illustrated in FIG. 4, may be arranged in the same direction as that of the data lines, but alternatively may be arranged in the same direction as that of the gate lines. Also, the signal line 130 may extend to an end of the display panel via a portion connected to the common electrode, or may extend to only the portion connected to the common electrode. In a case where the signal line 130 extends to only the portion connected to the common electrode, the display panel may further include a dummy signal line for adjusting a resistance between the common electrode and the signal line.

In FIG. 4, the signal line 130 may be connected to the common electrode through one the contact hole 111, but in order to minimize a contact defect and reduce a resistance, the signal line 130 may be connected to the common electrode through a plurality of contact holes. Also, two or more signal lines 130 may be connected to one common electrode 110, and moreover, the signal line 130 may be provided at a position overlapping the data line or the gate line, thereby securing a wide opening area (viewing area) of the display panel.

The touch driver 300 according to an embodiment, as illustrated in FIG. 4, may include a switching unit 310, and the switching unit 310 may be connected to the common electrodes of a corresponding group through the signal line 130. The switching unit 310 may be provided in plurality. A set of common electrodes connected to first channels ch1 of a plurality of channels in each of the switching units 310 may be defined as a first group G1, and a set of common electrodes connected to second channels ch2 of the plurality of channels may be defined as a second group G2. Therefore, in an embodiment of the present disclosure, in a case where the display panel includes a total of six groups, the plurality of switching units may each include six channels. The number of channels of the switching unit 310 may be the same as the number of groups, and the number of switching units may be the same as the number of common electrodes included in each of the groups. Here, the switching unit may be a multiplexer, or in terms of an input/output of a signal, the switching unit may be a de-multiplexer. The technical content of the switching unit has been disclosed in Korean Patent Application No. 10-2012-0016908 filed by the applicant, published as Korean Patent Application Publication No. 10-2013-0095461.

Figure 5A:
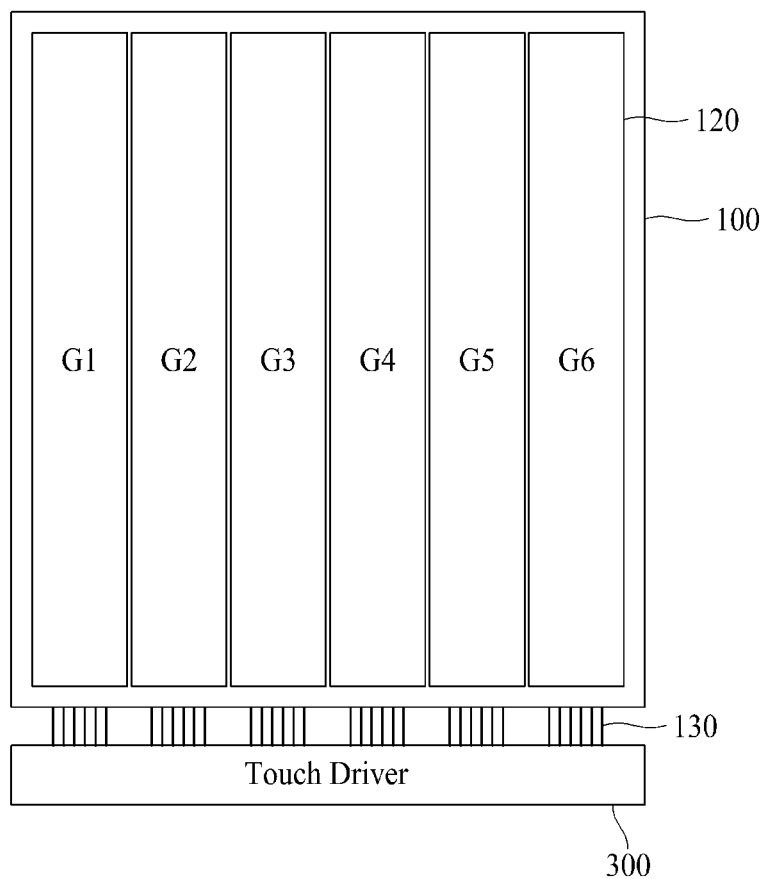
FIGS. 5A and 5B are plan views schematically illustrating an example where common electrodes according to an embodiment of the present disclosure are grouped.
Figure 5B:
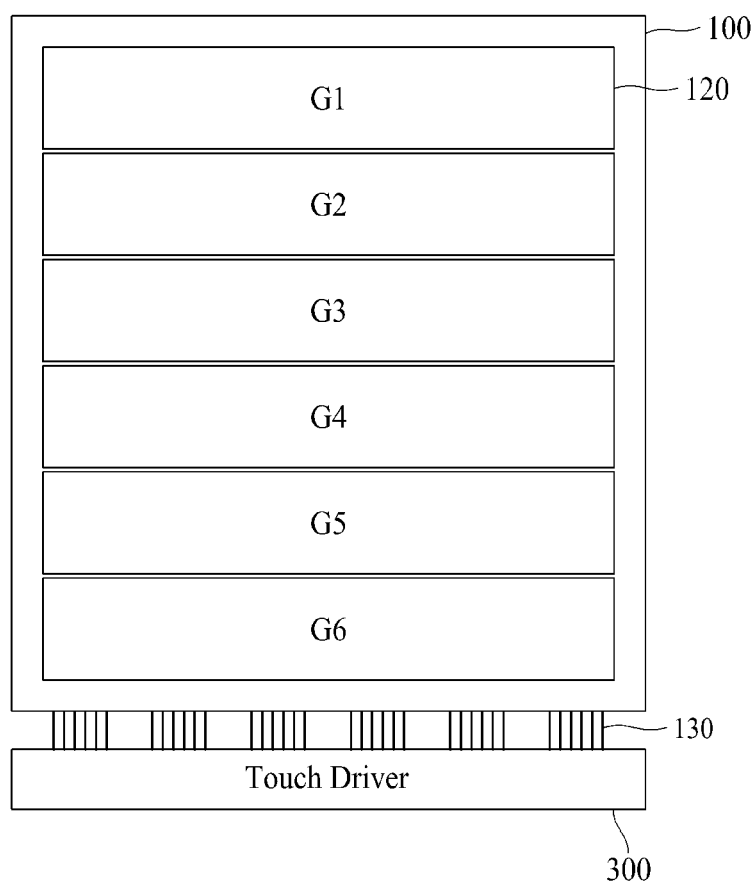

The common electrodes, as illustrated in FIG. 5A, may be grouped into a touch electrode group in a data line direction, and as illustrated in FIG. 5B, the common electrodes may be grouped into a touch electrode group in a gate line direction. A grouping direction may be set in order for the switching unit 310 to be the most efficiently connected to the common electrodes. In FIG. 5A, the group may be provided in a bar type, but is not limited thereto. Generally, the number of electrodes included in each group is the same, but in deformable displays, the groups may include a different number of electrodes.

During a single touch period, the touch driving signal may be applied to common electrodes of one group, but the touch driving signal may be simultaneously applied to common electrodes of two groups. For example, in a case where the common electrodes of the display panel are grouped into six groups and the display panel is divisionally driven in six touch periods during one frame (60 Hz), the touch driving signal may be applied to each of the groups only once, or the touch driving signal may be applied to each of the groups twice or more. Also, the touch driving signal may be applied to only one of the groups twice or more. For example, in a case where the touch driving signal is applied to each of the six groups only once, a touch report rate of the display device may be 60 Hz, and in a case where the touch driving signal is applied to each of the six groups twice, the touch report rate of the display device may be 120 Hz. In a case where the touch driving signal is applied to each of groups G1 to G3 once and is applied to each of groups G4 to G6 twice during one frame, the touch report rate may be 90 Hz.

In a case where the touch driving signal is applied to each of the groups twice or more, the touch driving signal may be simultaneously applied to two groups. To provide description with reference to the switching unit 310 and the group connection structure of FIG. 4, for example, in a case where the touch driving signal is simultaneously applied to a first group G1 and a second group G2 in a first touch period, the touch driving signal may be applied through the first channels ch1 and the second channels ch2 of each of six switching units included in the touch driver 300. Also, in a case where the touch driving signal is simultaneously applied to a third group G3 and a fourth group G4 in a second touch period, the touch driving signal may be applied through third channels ch3 and fourth channels ch4 of each of the six switching units included in the touch driver 300. Also, in a case where the touch driving signal is simultaneously applied to a fifth group G5 and a sixth group G6 in a third touch period, the touch driving signal may be applied through fifth channels ch5 and sixth channels ch6 of each of the six switching units included in the touch driver 300. In a case where one frame is divisionally driven in a total of six touch periods, the touch driving signal may be applied to all the common electrodes of the display panel during three touch periods, and during the total six touch periods, the touch driving signal may be applied to each of the common electrodes of the display panel twice.

In this manner, in a case where the touch driving signal is simultaneously applied to two groups, the touch driving signal may be applied to common electrodes included in two outermost groups G1 and G6 of the six groups during the first touch period, the touch driving signal may be applied to common electrodes included in groups G2 and G5 respectively adjacent to the two outermost groups G1 and G6 among the six groups during the second touch period, and the touch driving signal may be applied to common electrodes included in innermost groups G3 and G4 of the six groups during the third touch period. Alternatively, the touch driving signal may be applied to the common electrodes included in the innermost groups G3 and G4 of the six groups during the first touch period, the touch driving signal may be applied to common electrodes included in the groups G2 and G5 respectively adjacent to the innermost groups G3 and G4 among the six groups during the second touch period, and the touch driving signal may be applied to common electrodes included in the outermost groups G1 and G6 of the six groups during the third touch period. Due to such group division driving, a touch sensation and an accuracy of touch increase. This is because when it is assumed that two touch controllers are provided in the touch driver illustrated in FIG. 5A, a left touch controller is connected to three left groups G1 to G3, and a right touch controller is connected to three right groups G4 to G6. In terms of a connection type between each of the touch controllers and a plurality of groups, a resistance of a channel, and RC, two symmetrical groups G1:G6 (G2:G5 and G3:G4) may be paired with each other, and the touch driving signal may be applied to each of the paired groups G1:G6, the paired groups G2:G5, and the paired groups G3:G4. For reference, considering a position disposed in the display panel and a connection relationship between the groups and the touch controllers of the touch driver, a first group G1 and a sixth group G6 may be groups which are symmetrical.

Figure 6A:
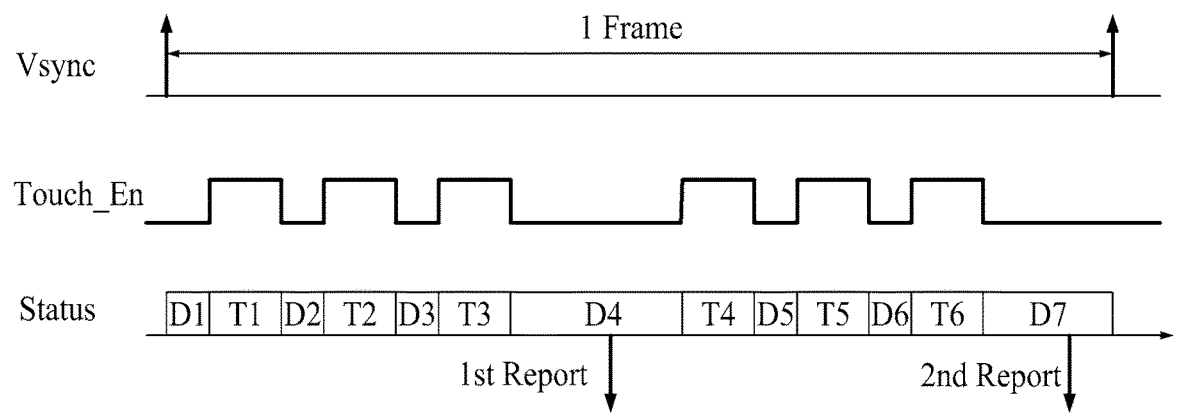
FIGS. 6A and 6B are time division driving timing diagrams of a touch screen display device according to an embodiment of the present disclosure.
Figure 6B:
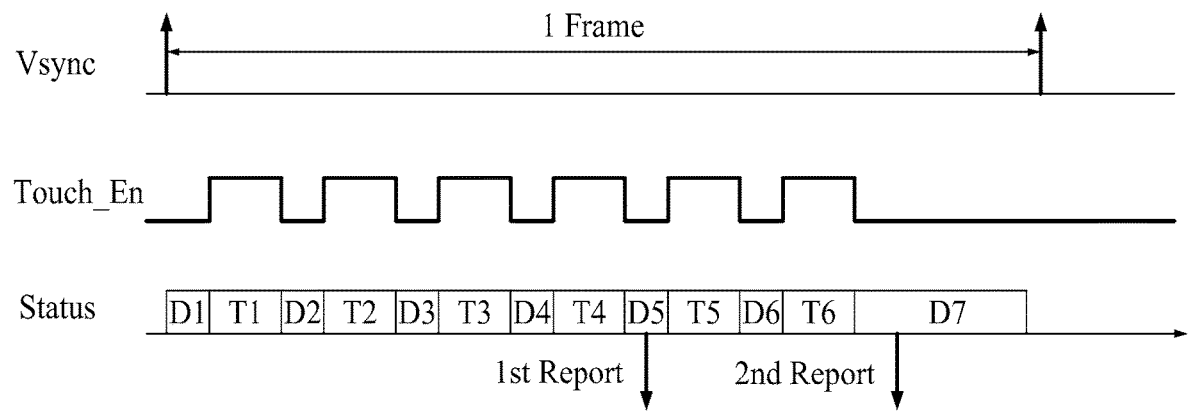

Hereinafter, time division driving of the touch screen display device according to an embodiment of the present disclosure will be described with reference to FIGS. 6A and 6B. FIGS. 6A and 6B are diagrams showing 6Long H_Blank driving. FIGS. 6A and 6B are time division driving timing diagrams of the touch screen display device according to an embodiment of the present disclosure. The timing diagrams of FIGS. 6A and 6B show a common feature where a length of a specific display period differ from lengths of other display periods. In the timing diagrams of FIGS. 6A and 6B, a total of six touch periods may be executed during one frame, and time division driving may be performed in a 6Long H_Blank driving method. Hereinafter, the Long H_Blank may be referred to as LHB.

The 6Long H_Blank (6LHB) method shown in FIGS. 6A and 6B may be a method where the touch period are executed total six times in a method where the display period and the touch period are time-divisionally driven several times during one frame divided by the vertical synchronization signal Vsync. The LHB may be a method where a period of a specific horizontal synchronization signal Hsync is long allocated and used as a touch period. In the 6LHB, periods of six specific horizontal synchronization signals Hsync are long allocated.

During a temporally divided display period, the pixels of the display panel may be divisionally driven, and during the touch period, the touch electrodes of the display panel may be divided into units of groups and may be supplied with the touch driving signal. In this case, the display period and the touch period may be alternately and repeatedly executed. An operation of applying the touch driving signal to all touch electrodes and then transmitting touch data of the touch electrodes to the host system may be performed twice in a frame to which the touch driving signal is applied. The display period and the touch period may be differentiated from each other according to the touch enable signal Touch_En, and in FIGS. 6A and 6B, when the touch enable signal is activated (ON), this may be defined as the touch period. However, the present embodiment is not limited thereto.

As shown in FIGS. 6A and 6B, in the 6LHB driving method according to various embodiments of the present disclosure, a length of a specific display period may differ from that of another display period. For example, as shown in FIG. 6A, during one frame, a length of a fourth display period D4 and a length of a seventh display period D7 may differ from lengths of the other display periods D1, D2, D3, D5, and D6, and as shown in FIG. 6B, during one frame, the length of the seventh display period D7 may differ from lengths of the other display periods D1, D2, D3, D4, D5, and D6. Particularly, a length of a specific display period may be longer than those of the other display periods.

In this manner, a length of a specific display period may be differently set, and thus, audible noise is reduced in comparison with general LHB driving. The audible noise is noise which is heard to a user when driving the display device, and uses decibel (dB) as a unit. Decibel is used as a criterion for a level of sound intensity, a flow pressure level, a power level, etc. in a sound relationship. An intensity variation of sound of 1 dB or less is difficult for persons to recognize through hearing, and when driving the display device, 3 dB or less may be set to an audible noise reference value. Therefore, an average specification of display device products should satisfy 3 dB or less. Ideally, 2.4 dB or less is better. In a case where the display period and the touch period are regularly and uniformly repeated as in LHB driving, when noise is regularly repeated, audibility increases, and for this reason, audible noise increases. Therefore, by irregularly setting a length of a specific display period, audibility is reduced, and by differently setting a length of a specific display period, a time taken in offsetting noise is secured.

The following Table 1 shows an experiment result obtained by comparing an audible frequency of LHB and an audible frequency of 6LHB.

TABLE 1

| Unit: dB | SPEC | SET1 | SET2 | SET3 | Avg. |
|---|---|---|---|---|---|
| LHB | 3 dB ↓ | 4.1 | 5.6 | 3.9 | 4.5 |
| 6LHB | Idle: 2.4 dB | 1.7 | 1.9 | 2.0 | 1.9 |

As shown in Table 1, a mean of audible frequencies of the LHB is 4.5 dB and causes noise within an audible range of a user, and is evaluated as a noise level which does not satisfy a mean specification of products. However, a mean of audible frequencies of the 6LHB is 1.9 dB and is a value which is far lower than an ideal audible frequency. In the 6LHB driving method, a length of a specific display period is set differently from a length of another display period, and thus, audible noise is lowered to less than a specification of a product in comparison with the LHB driving method. As described above, in order to secure a time taken in offsetting noise, a length of a specific display period may be set longer than that of another display period.

For reference, FIGS. 6A and 6B each shows a driving method which reduces audible noise in comparison with the LHB driving. Particularly, in FIG. 6A, an interval between a first touch report (1st report) time and a second touch report (2nd report) time of a current frame, an interval between the second touch report (2nd report) time of the current frame and a first touch report (1st report) time of a next frame, and an interval between the first touch report (1st report) time and a second touch report (2nd report) time of the next frame are the same, and thus, a touch report is regularly performed, thereby securing a uniformity of the touch report. A first touch report (1st report) time of FIG. 6B is faster than the first touch report (1st report) time of FIG. 6A. Here, the touch report time being faster denotes that touch latency is less. The touch latency denotes a time taken from a time, when the touch driving signal is initially applied to the touch electrode of the display panel, to a time when the touch driving signal is applied to all the touch electrodes of the display panel and then coordinates are transferred from the touch driver to the host system. The touch latency will be described in detail with reference to FIG. 8. For reference, in FIGS. 6A and 6B, first touch report times D4 and D7 and second touch report times D5 and D7 are not limited thereto. In other embodiments, the first touch report times D4 and D7 and the second touch report times D5 and D7 may each be changed based on a division method of dividing the display period and the touch period and a division time when the display period and the touch period are divided.

Hereinafter, group division driving of the touch screen display device according to an embodiment of the present disclosure will be described with reference to FIG. 7. The group division driving of the display device to be described below with reference to FIG. 7 will be described on the assumption that the display device is driven based on a time division driving timing shown in FIG. 6A, but is not limited thereto. In other embodiments, the group division driving of the display device may be driven based on a time division driving timing shown in FIG. 6B.

Figure 7:
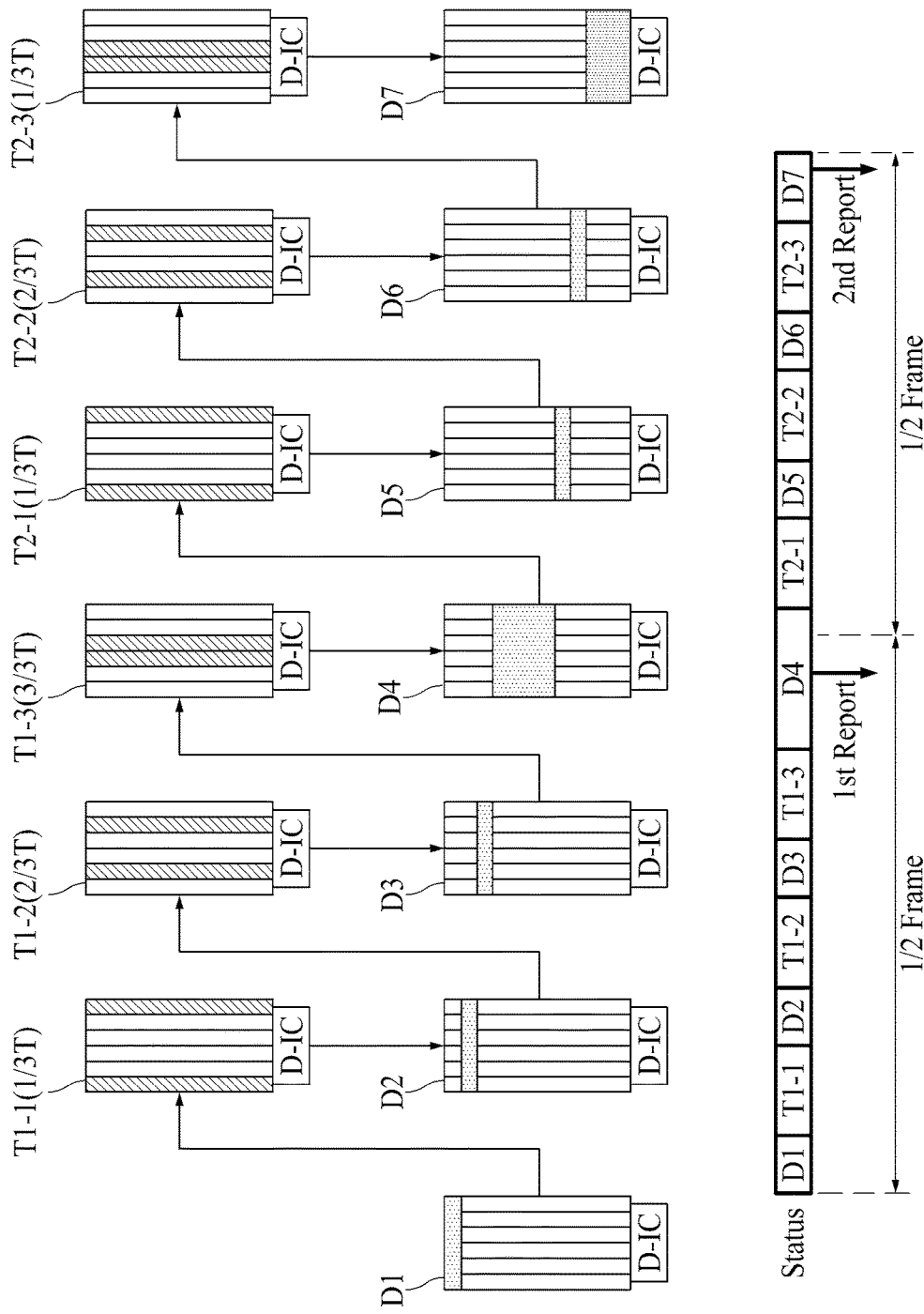
FIG. 7 is a diagram showing group division driving of a touch screen display device according to an embodiment of the present disclosure.

Moreover, in FIG. 7, an embodiment where seven display periods and six touch periods are time-divisionally driven during one frame is described, but is not limited thereto. In other embodiments, six display periods and six touch periods may be time-divisionally driven. Whether the display period is divided into seven periods or six periods may be determined based on a time when the vertical synchronization signal Vsync defining one frame starts a corresponding frame.

A case where the display period is divided into six periods will be described with reference to a lower timing diagram of FIG. 7. A start of one frame is a time when a first touch period T1-1 starts, and an end of the one frame is a time when a seventh display period D7 ends. In this case, a length of the seventh display period D7 becomes longer by the length of a first display period D1. In other words, based on a time when the vertical synchronization signal defines a frame, the seventh display period D7 becomes longer by the length of the first display period D1, and the length of the seventh display period D7 becomes equal to that of a fourth display period D4.

Determination of whether the display period is divided into seven periods or six periods during one frame does not affect that the touch latency obtained through the 6LHB driving becomes faster and audible noise is reduced. That is, the time division driving method according to embodiments of the present disclosure can achieve and obtain by driving the touch period into six periods during one frame and differently setting a length of a specific display period.

In FIG. 7, the display panel of the display device may include six common electrode groups, and this is the same as the above-described group of FIG. 5A. In FIG. 7, the display panel of the display device may divide the display period into a total of seven display periods and divide the touch period into six touch periods, and may be driven in the seven display periods and the six touch periods. The entire display panel may be divisionally driven in the seven display periods to display an image on one screen, and common electrodes of a common electrode group of the display panel may be supplied with the touch driving signal during the six touch periods. If the touch driving signal is applied to one group during a single touch period, the touch driving signal may be applied to each of all common electrodes once during one frame, and thus, the touch report rate may be 60 Hz. In the display panel of FIG. 7 according to the present embodiment, since the touch driving signal is simultaneously applied to two groups during a single touch period, the touch driving signal may be applied to each of all common electrodes twice during one frame. That is, the touch report rate of the display device of FIG. 7 may be 120 Hz.

The display panel of FIG. 7 may include the common electrode. In the display period of the display panel, the common electrode may be supplied with the common voltage to act as a display electrode, and in the touch period, the common electrode may be supplied with the touch driving signal to act as a touch electrode. A plurality of common electrodes, as illustrated in FIG. 7, may be configured as groups, and in FIG. 7, the common electrodes may be grouped into a total of six groups. The group 120 may be defined as a set of touch electrodes to which the touch driving signal is simultaneously applied, namely, the group 120 may be a logical unit which is divided in terms of a circuit for application of the touch driving signal, instead of a unit for physically dividing the touch electrodes.

The display panel of FIG. 7 may display an image on a first display area of the display panel by using the gate driver and the data driver during a first display period D1. Subsequently, the touch driver may apply the touch driving signal to common electrodes configuring a first touch area G1 and G6 of the display panel during a first touch period T1-1 (⅓T). Here, T1-1(⅓T) may denote that the touch driving signal is applied to a one-third (⅓) area of the whole display panel during a 1-1st touch period. Subsequently, the display panel may display an image on a second display area of the display panel during a second display period D2. Subsequently, the touch driver may apply the touch driving signal to a second touch area G2 and G5 of the display panel during a second touch period T1-2(⅔T). Here, T1-2(⅔T) may denote that the touch driving signal is applied to another one-third (⅓) area such that the touch driving signal is applied to a two-third (⅔) area of the whole display panel by the end of the 1-2nd touch period. Subsequently, the display panel may display an image on a third display area of the display panel during a third display period D3. Subsequently, the touch driver may apply the touch driving signal to a third touch area G3 and G4 of the display panel during a third touch period T1-3(3/3T). Here, T1-3(3/3T) may denote that the touch driving signal is applied to another one-third (⅓) area such that the touch driving signal is applied an area of the entire display panel by the end of a 1-3rd touch period.

Since the touch driving signal is applied to all common electrodes of the display panel through driving by the end of the third touch period, touch data such as touch position coordinates obtained by sensing all the common electrodes of the display panel may be transmitted from the touch driver to the external host system. That is, touch coordinates may be reported to a host after the third touch period. This period may be a fourth display period D4 generally, but is not limited thereto.

Subsequently, the display panel may display an image on a fourth display area of the display panel by using the gate driver and the data driver during the fourth display period D4. Here, the fourth display period D4 may differ from a length of each of the first, second, and third display periods. In other words, a length of the fourth display period D4 may be set longer than that of another display period. Accordingly, audible noise is reduced, and a time taken in offsetting the audible noise is secured.

Subsequently, the touch driver may apply the touch driving signal to the common electrodes configuring the first touch area G1 and G6 of the display panel during a fourth touch period T2-1(⅓T). Here, T2-1(⅓T) may denote that the touch driving signal is applied to a one-third (⅓) area of the whole display panel during a 2-1st touch period. Subsequently, an image may be displayed on a fifth display area of the display panel during a fifth display period D5. Subsequently, the touch driver may apply the touch driving signal to the second touch area G2 and G5 of the display panel during a fifth touch period T2-2(⅔T). Here, T2-2(⅔T) may denote that the touch driving signal is applied to another one-third (⅓) area such that the touch driving signal is applied to a two-third (⅔) area of the entire display panel by the end of a 2-2nd touch period. Subsequently, an image may be displayed on a sixth display area of the display panel during a sixth display period D6. Subsequently, the touch driver may apply the touch driving signal to the third touch area G3 and G4 of the display panel during a sixth touch period T2-3(3/3T). Here, T2-3(3/3T) may denote that the touch driving signal is applied to another one-third (⅓) area such that the touch driving signal is applied to the area of the entire display panel by the end of a 2-3rd touch period.

Since the touch driving signal is applied to all common electrodes of the display panel through driving once more until the sixth touch period, touch data such as touch position coordinates obtained by sensing all the common electrodes of the display panel may be transmitted from the touch driver to the external host system once more. That is, touch coordinates may be reported to the host after the sixth touch period. This period may be a seventh display period D7 generally, but is not limited thereto.

Subsequently, the display panel may display an image on a seventh display area of the display panel by using the gate driver and the data driver during the seventh display period D7. Here, the seventh display period D7 may differ from a length of each of the first and third display periods and may differ from the fifth and sixth display periods. In other words, a length of the seventh display period D7 may be set longer than that of the above-described four display periods. Accordingly, audible noise is reduced, and a time taken in offsetting the audible noise is secured. For reference, as illustrated in FIG. 7, the seventh display period may be set shorter than a length of the fourth display period, and a difference therebetween may be equal to a length of the first display period. Generally, the first to third display periods and the fifth and sixth display periods may be set to have the same length.

Figure 8A:
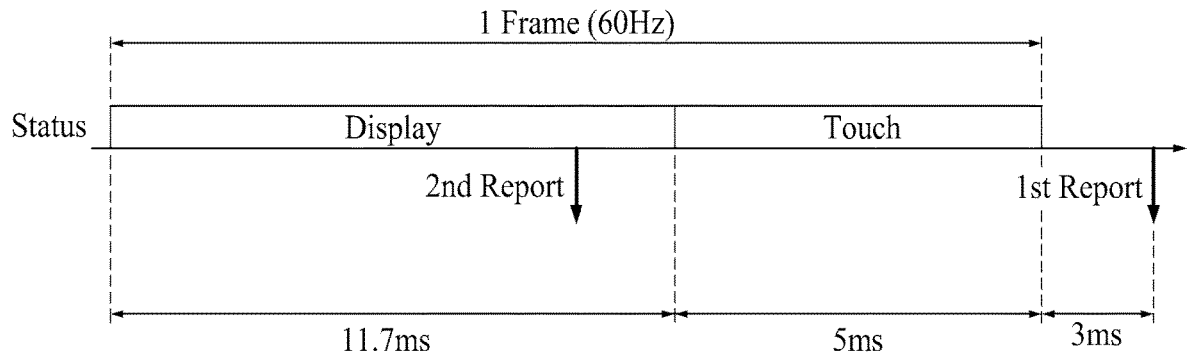
FIGS. 8A, 8B, and 8C are timing diagrams showing a result obtained by comparing touch latencies based on a time division driving method.
Figure 8B:
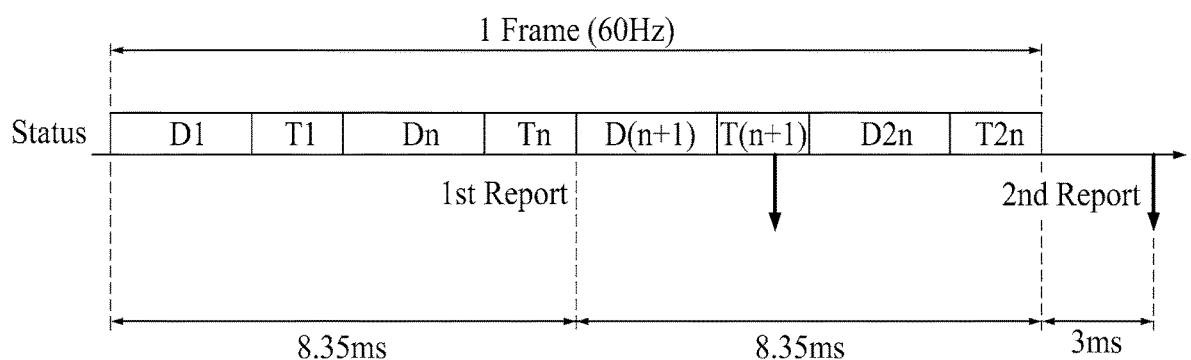
Figure 8C:
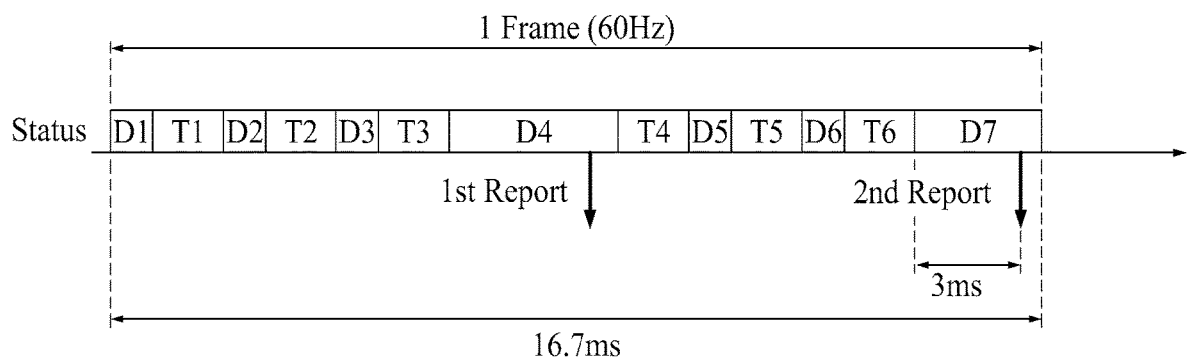

Hereinafter, touch latency of the time-divisionally driven touch screen display device according to an embodiment of the present disclosure will be described with reference to FIGS. 8A, 8B, and 8C. FIGS. 8A, 8B and 8C are timing diagrams showing a result obtained by comparing touch latencies based on a time division driving method. In FIGS. 8A to 8C, one frame is one 60 Hz period, a time based on the one frame is 1/60 seconds, which is 16.7 ms, and a touch report rate is 120 Hz.

The touch latency denotes a time taken from a time, when the touch driving signal is initially applied to the common electrode of the display panel, to a time when the touch driving signal is applied to all the common electrodes of the display panel and then calculated touch coordinates are transferred from the touch driver to the host system. That is, the touch latency may denote a time which stands by or is delayed until a touch report is performed from a time when the touch driving signal is applied to the common electrode. In calculating touch latency, in an embodiment of the present disclosure, a touch coordinate calculation time is assumed as 3 ms.

First, FIG. 8A is a timing diagram showing touch latency in V_Blank driving. A V_Blank driving method of FIG. 8A is an interpolation V_Blank driving method and obtains a touch report rate of 120 Hz. A normal V_Blank driving method performs a one-time touch report during one frame (60 Hz), and thus, a touch report rate is 60 Hz. However, the interpolation V_Blank driving method is a method of calculating touch data of a current frame by using touch data of a previous frame, and thus, a touch report rate of 120 Hz is obtained. For reference, since the interpolation V_Blank driving method is a method of calculating touch data by using data of a previous frame instead of real data, a touch report rate of 120 Hz is obtained, but an accuracy of touch is inevitably reduced.

In the interpolation V_Blank (120 Hz) driving method, a display period may be set to about 11.7 ms, and a touch period may be set to about 5 ms. Therefore, in interpolation V_Blank driving, if touch latency is calculated by summing a touch period (5 ms) of a previous frame, a display period (11.7 ms) of a current frame, a touch period (5 ms) of the current frame, and a touch coordinate calculation time (3 ms), 24.7 ms (5+11.7+5+3) may be obtained. In interpolation V_Blank driving, since touch data of a previous frame is needed, the touch period (5 ms) of the previous frame and the display period (11.7 ms) of the current frame may be added.

FIG. 8B is a timing diagram showing touch latency in LHB driving. A Long H_Blank (LHB) driving method of FIG. 8B is a method where a display period and a touch period are time-divisionally driven a plurality of times during one frame, and thus, in FIG. 8B, total 2n number of display periods and total 2n number of touch periods are alternately repeated. In FIG. 8B, a touch report is performed twice during one frame (60 Hz), and thus, a touch report rate of 120 Hz is obtained.

Touch latency in the LHB driving method may be calculated based on a touch period Tn, where the touch driving signal is applied to each of all the common electrodes of the display panel having one frame of 16.7 ms once, and a touch period T2$n$ where the touch driving signal is applied to each of all the common electrodes twice. That is, 19.7 ms (8.35+8.35+3) may be obtained by summating a time (8.35 ms) for which the touch driving signal is applied to each of all the common electrodes once, a time (8.35 ms) for which the touch driving signal is applied to each of all the common electrodes twice, and a touch coordinate calculation time (3 ms). In the touch period Tn, a time taken until a first touch report (1st report) is included in subsequent periods D(n+1) to T2$n$, and thus, is not applied to total latency calculation.

Finally, FIG. 8C is a timing diagram showing touch latency in 6LHB driving according to an embodiment of the present disclosure. A 6LHB driving method of FIG. 8C performs a two-time touch report during one frame divided by the vertical synchronization signal, and thus, a touch report rate of 120 Hz is obtained. As shown in FIG. 8C, a second touch report (2nd report) is completed before one frame (16.7 ms) ends, and thus, the touch latency is faster than a time (16.7 ms) of one frame, namely, is faster than the touch latency in the interpolation V_Blank and the touch latency in the LHB. In other words, a standby time or a delay time taken until a touch report is performed from after a time when the touch driving signal is applied is shorter than the touch latency in the interpolation V_Blank and the touch latency in the LHB.

Figure 9A:
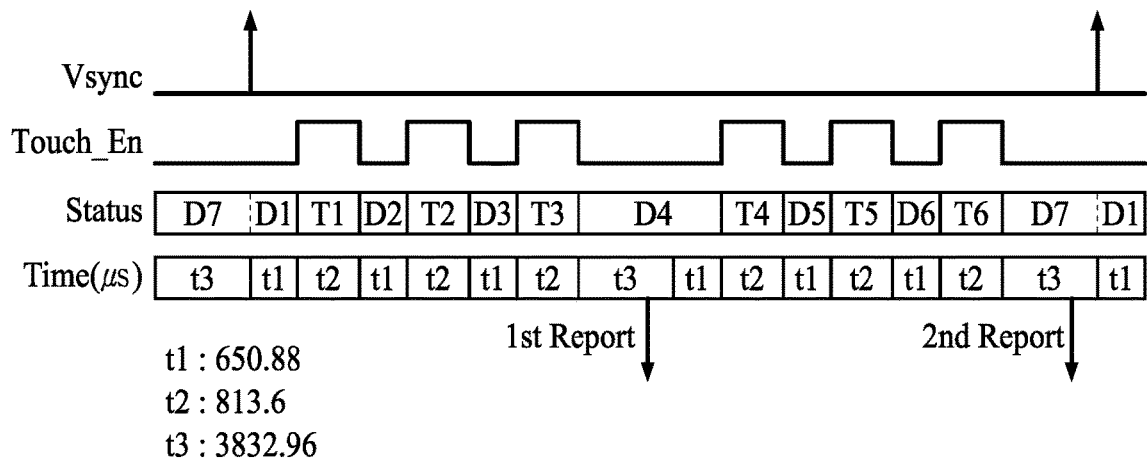
FIGS. 9A and 9B show data where a timing of 6 LHB according to an embodiment of the present disclosure has been actually measured.
Figure 9B:
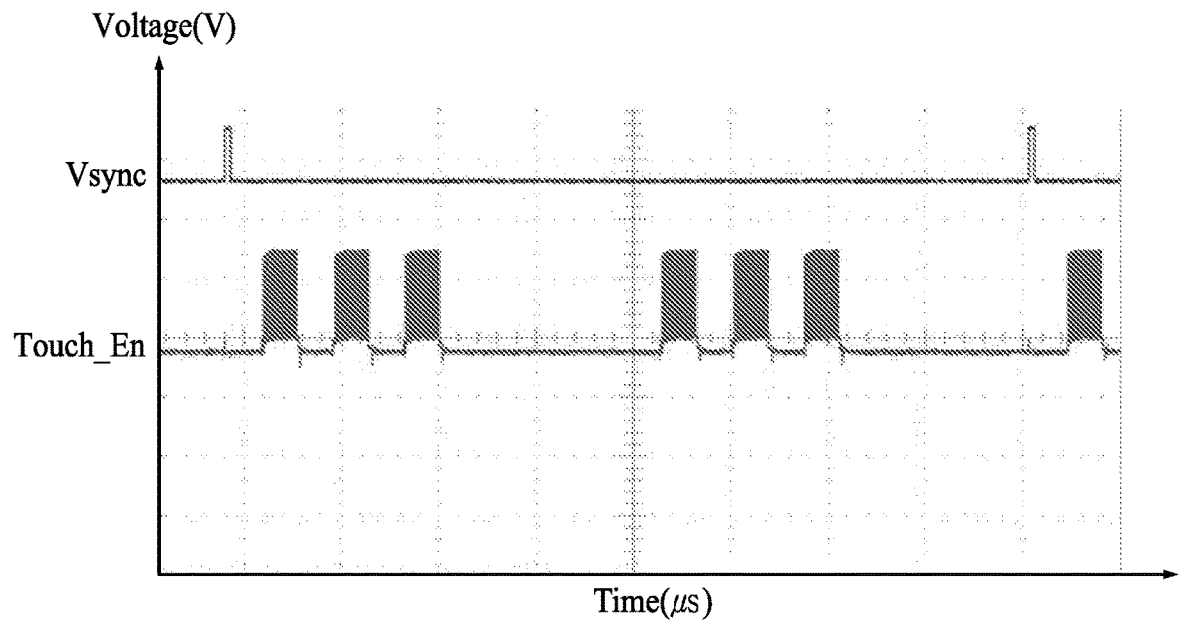

The touch latency in the 6LHB driving method will be described in more detail with reference to FIGS. 9A and 9B. FIGS. 9A and 9B shows data where a timing of 6 LHB according to an embodiment of the present disclosure has been actually measured.

As shown in FIGS. 9A and 9B, in a timing diagram of the 6LHB according to an embodiment of the present disclosure, seven display periods and six touch periods are time-divisionally driven during one frame defined by Vsync. Each of first to third display periods t1 is 650.88 μs, a fourth display period "t3+t1" is 4483.84 μs (3832.96+650.88), each of fifth and sixth display periods is 650.88 μs, and a seventh display period t3 is 3832.96 μs. Each of first to sixth touch periods t2 is 813.6 μs and is the same. As in FIG. 8C, when a touch coordinate calculation time is assumed as 3 ms (3000 μs), a first touch report is performed in a fourth display period D4, and a second touch report is performed in a seventh display period D7. In a case where 6LHB touch latency according to an embodiment of the present disclosure is calculated based on real measurement data, about 15.619 ms (15619 μs) is obtained by summating a time (4394.44 μs) taken from the first display period D1 to the third touch period, a time (8226.4 μs) taken from the fourth display period D4 to the sixth touch period, and a touch coordinate calculation time (3 ms) during a second touch report period. Here, a touch coordinate calculation time (3 ms) during a first touch report period is included in the fourth display period D4, and thus, is not applied to total latency calculation. A value calculated based on the real measurement data is similar to a touch latency calculation result of FIG. 8C, and thus, it can be seen that touch latency in the 6LHB is less (i.e., touch report is faster) than the touch latency in the interpolation V_Blank and the touch latency in the LHB.

A timing diagram of FIG. 9B shows measurement data corresponding to a Vsync signal and a Touch_En signal of FIG. 9A. That is, an upper timing diagram of FIG. 9B shows measurement data of the Vsync signal according to an embodiment of the present disclosure, and a lower timing diagram shows measurement data of the Touch_En signal (Voltage) according to an embodiment of the present disclosure. As in the measurement data shown in FIG. 9B, if six touch periods are executed during one frame, at least one display period differs from the other display periods. A length of each touch period and a length of each display period are the same as a time shown in Time (μs) of FIG. 9A.

Touch latency is a time taken until coordinates are transferred from the touch driver to the host system from after the touch driving signal is applied to the touch electrode of the display panel. Therefore, despite a time division driving method for realizing the same touch report rate (120 Hz), if touch latencies differ a little more, the host system may more quickly process coordinates, and thus, it is expected to enhance a touch sensation and touch performance.

The touch screen display device according to various embodiments of the present disclosure may use the 6LHB driving method where a touch period is divided into six periods during one frame, and may divide a display period into six or seven periods during the one frame.

Furthermore, in a case where the display period and the touch period are regularly and uniformly repeated as in LHB driving, when noise is regularly repeated, audibility increases, and for this reason, a length of a specific display period is set long, thereby securing a time taken in offsetting noise.

Moreover, touch latency which is less than the touch latency in the LHB and the touch latency in the interpolation V_Blank implemented at a touch report rate of 120 Hz is achieved, and thus, it is expected to enhance a touch sensation and touch performance.

For reference, in a case where the display panel is driven in a 4LHB driving method and a 2LHB driving method where a touch period is divided into two periods, an interval between display periods is too long, and for this reason, an image quality defect such as recognition of a middle horizontal line occurs in driving a screen. Also, in a case where the display panel is driven in an 8LHB driving method and a 10LHB driving method, problems such as audible noise and touch latency delay occur in comparison with the 6LHB. Therefore, the 6LHB driving method is the most suitable method where by setting a length of a specific display period long, audible noise is lowered to an ideal value, and touch latency is enhanced.

The present disclosure provides the touch screen display device which includes the first driver allowing an image to be displayed on the first area of the display panel during the first display period and allowing an image to be displayed on the second area of the display panel during the second display period and the second driver applying the touch driving signal to the third area of the display panel during the first touch period and where a length of the first display period and a length of the second display period are differently set in LHB driving, and thus, audible noise is minimized and touch latency is reduced.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A touch screen display device, including display periods and at least a touch period which are time-divisionally driven, comprising:
    a display panel;
    a first driver to provide first data voltages for displaying an image to a predetermined first area of the display panel during a first display period of one frame period defined by two vertical synchronization signals, to provide second data voltages for displaying the image to a predetermined second area of the display panel during a second display period of the one frame period, and to provide third data voltages for displaying the image to a predetermined third area of the display period during a third display period of the one frame period; and
    a second driver to apply a touch driving signal to one or more first touch electrodes in a predetermined fourth area of the display panel during a first touch period of the one frame period, and to apply the touch driving signal to one or more second touch electrodes in a predetermined fifth area of the display panel during a second touch period of the one frame period,
    wherein a length of the first display period in the one frame period differs from a length of the second display period or a length of the third display period in the one frame period, and the first touch period is between the first display period and the second display period, and the second touch period is between the second display period and the third display period.

2. The touch screen display device of claim 1, wherein a length of the first touch period is the same as a length of the second touch period.

3. The touch screen display device of claim 1, wherein the second display period is longer than the first display period.

4. The touch screen display device of claim 3, wherein a length of the third display period is shorter than the second display period and longer than the first display period.

5. The touch screen display device of claim 1, wherein during the second display period, touch data based on the touch driving signal applied to the touch electrodes in the predetermined fourth area is transmitted to a host system.

6. The touch screen display device of claim 1, wherein the second driver applies the touch driving signal to the first touch electrodes of the predetermined fourth area twice or more during the one frame period, or applies the touch driving signal to the second touch electrodes of the predetermined fourth fifth area twice or more during the one frame period.

7. The touch screen display device of claim 1, wherein the touch electrodes are grouped into 2n number of groups, and during the first touch period, the touch driving signal is applied to the touch electrodes included in two groups of the 2n groups.

8. The touch screen display device of claim 7, wherein
during the first touch period, the second driver applies the touch driving signal to the touch electrodes included in two outermost groups of the 2n groups, and during the second touch period, the second driver applies the touch driving signal to the touch electrodes included in groups respectively adjacent to the two outermost groups among the 2n groups, or during the first touch period, the second driver applies the touch driving signal to the touch electrodes included in two innermost groups of the 2n groups, and during the second touch period, the second driver applies the touch driving signal to touch electrodes included in groups respectively adjacent to the two innermost groups among the 2n groups.

9. A driving circuit of a touch screen display device, the driving circuit comprising:
a first driver to provide first data voltages for displaying an image on a predetermined first area of a display panel during a first display period of one frame period defined by two vertical synchronization signals, to provide second data voltages for displaying the image on a predetermined second area of the display panel during a second display period of the one frame period, and to provide third data voltages for displaying the image to a predetermined third area of the display period during a third display period of the one frame period; and
a second driver to apply a touch driving signal to one or more first touch electrodes in a predetermined fourth area of the display panel during a first touch period of the one frame period, and to apply the touch driving signal to one or more second touch electrodes in a predetermined fifth area of the display panel during a second touch period of the one frame period,
wherein a length of the first display period in the one frame period differs from a length of the second display period or a length of the third display period in the one frame period, and the first touch period is between the first display period and the second display period, and the second touch period is between the second display period and the third display period.

10. The driving circuit of claim 9, wherein the second display period is longer than the first display period.

11. The driving circuit of claim 10, wherein a length of the third display period is shorter than the second display period and longer than the first display period.

12. The driving circuit of claim 9, wherein during the second display period, touch data based on the touch driving signal applied to the predetermined third area is transmitted to a host system.

13. A touch screen display device, comprising:
a display panel including a plurality of touch electrodes and a plurality of pixels at intersections of a plurality of gate lines and a plurality of data lines; and
driver circuitry to provide data voltages to the pixels for display of an image during a plurality of display periods and to apply a touch driving signal to the touch electrodes during a plurality of touch periods,
wherein a first predetermined number of the display periods and a second predetermined number of the touch periods are provided within one frame period, the first predetermined number of the display periods including a first display period, a second display period, and a third display period during the one frame period, and the second predetermined number of touch periods including a first touch period and a second touch period during the one frame period;
wherein the first predetermined number of the display periods alternate with the second predetermined number of the touch periods within said one frame period; and
wherein a first length of the first display period within said one frame period is different from a second length of the second display period or a third length of the third display period within said one frame period.

14. The touch screen display device of claim 13, wherein the driver circuitry performs touch reporting during the first display period having the first length different from the second length and the third length.

15. The touch screen display device of claim 14, wherein the first length is longer than the second length.

16. The touch screen display device of claim 14, wherein the driver circuitry performs touch reporting twice during said one frame period.

17. The touch screen display device of claim 13, wherein:
the second length of the second display period is longer than the first length of the first display period;
the first touch period occurs between the first display period and the second display period;
the driver circuitry provides a first set of the pixels with a first set of the data voltages during the first display period and a second set of the pixels with a second set of the data voltages during the second display period;
the driver circuitry applies the touch driving signal to a first set of the touch electrodes during the first touch period; and
the driver circuitry performs touch reporting during the second display period.

18. The touch screen display device of claim 17, wherein:
the second touch period occurs subsequent to the second display period; and
the driver circuitry applies the touch driving signal to a second set of the touch electrodes during the second touch period.

19. The touch screen display device of claim 13, wherein:
the first predetermined number of the display periods further include a fourth display period, a fifth display period, a sixth display period, and a seventh display period occurring in sequence within the one frame period, the seventh display period being longer than the first, second, third, fourth, fifth, and sixth display periods;
wherein the first touch period is between the first display period and the second display period, and the second touch period is between the second display period and the third display period, wherein the second predetermined number of the touch periods further include, within the one frame period, a third touch period between the third display period and the fourth display period, a fourth touch period between the fourth display period and the fifth display period, a fifth touch period between the fifth display period and the sixth display period, and a sixth touch period between the sixth display period and the seventh display period; and
the driver circuitry performs touch reporting during the seventh display period.

20. The touch screen display device of claim 19, wherein:
the fourth display period is longer than the first, second, third, fifth, sixth, and seventh display periods; and
the driver circuitry further performs touch reporting during the fourth display period.

21. The touch screen display device of claim 13, wherein the second predetermined number of the touch periods provided within the one frame period have a same length.

22. The touch screen display device of claim 13, wherein the one frame period is defined by two consecutive vertical synchronization signals.

* * * * *